US010335876B2

(12) United States Patent
Schulte

(10) Patent No.: US 10,335,876 B2
(45) Date of Patent: Jul. 2, 2019

(54) GRINDING MACHINE WITH PIVOTABLE TOOL SPINDLE

(71) Applicant: Klingelnberg AG, Zürich (CH)

(72) Inventor: Joachim Schulte, Remscheid (DE)

(73) Assignee: KLINGELNBERG AG (CH)

( * ) Notice: Subject to any disclaimer, the term of this patent is extended or adjusted under 35 U.S.C. 154(b) by 148 days.

(21) Appl. No.: 15/598,429

(22) Filed: May 18, 2017

(65) Prior Publication Data

US 2017/0334007 A1    Nov. 23, 2017

(30) Foreign Application Priority Data

May 19, 2016 (DE) .......................... 10 2016 006 070

(51) Int. Cl.
| B23F 5/04 | (2006.01) |
| B24B 41/00 | (2006.01) |
| B24B 53/075 | (2006.01) |

(52) U.S. Cl.
CPC .............. B23F 5/04 (2013.01); B24B 41/002 (2013.01); B24B 53/075 (2013.01)

(58) Field of Classification Search
CPC .... B23F 1/02; B23F 1/023; B23F 5/04; B24B 41/002; B24B 53/075; B24B 53/085
See application file for complete search history.

(56) References Cited

U.S. PATENT DOCUMENTS

| 4,561,216 A * | 12/1985 | Miyatake | B23F 5/04 409/15 |
| 5,139,005 A * | 8/1992 | Dodd | B23F 23/1225 125/11.01 |
| 5,228,814 A * | 7/1993 | Suwijn | B23F 5/04 409/12 |
| 5,257,882 A * | 11/1993 | Stadtfeld | B23F 9/025 409/26 |
| 5,791,840 A * | 8/1998 | Sijtstra | B23F 5/04 409/12 |
| 5,857,894 A * | 1/1999 | Griesbach | B23F 5/04 409/183 |
| 9,409,244 B2 * | 8/2016 | Geiser | B23F 23/1218 |
| 9,498,833 B2 * | 11/2016 | Burri | B23F 17/006 |
| 2007/0292224 A1 * | 12/2007 | Gumpl | B23F 5/20 409/26 |
| 2016/0176010 A1 * | 6/2016 | Bucksch | B23Q 1/60 451/273 |

\* cited by examiner

*Primary Examiner* — Timothy V Eley
(74) *Attorney, Agent, or Firm* — McCarter & English, LLP

(57) ABSTRACT

A grinding machine, includes a pivotable tool spindle with a workpiece spindle adapted to receive a gearwheel workpiece and for rotationally driving the gearwheel workpiece about a workpiece spindle axis, wherein the tool spindle is configured to receive a grinding tool and rotationally drive the grinding tool about a tool spindle axis, and is carried by a pivot axis in such a way that the tool spindle together with the grinding tool can be pivoted about the pivot axis, and wherein the pivot axis (A) intersects the workpiece spindle axis (C) in a common plane projection, and wherein the pivot axis is offset laterally relative to the workpiece spindle axis and does not intersect the workpiece spindle axis.

9 Claims, 6 Drawing Sheets

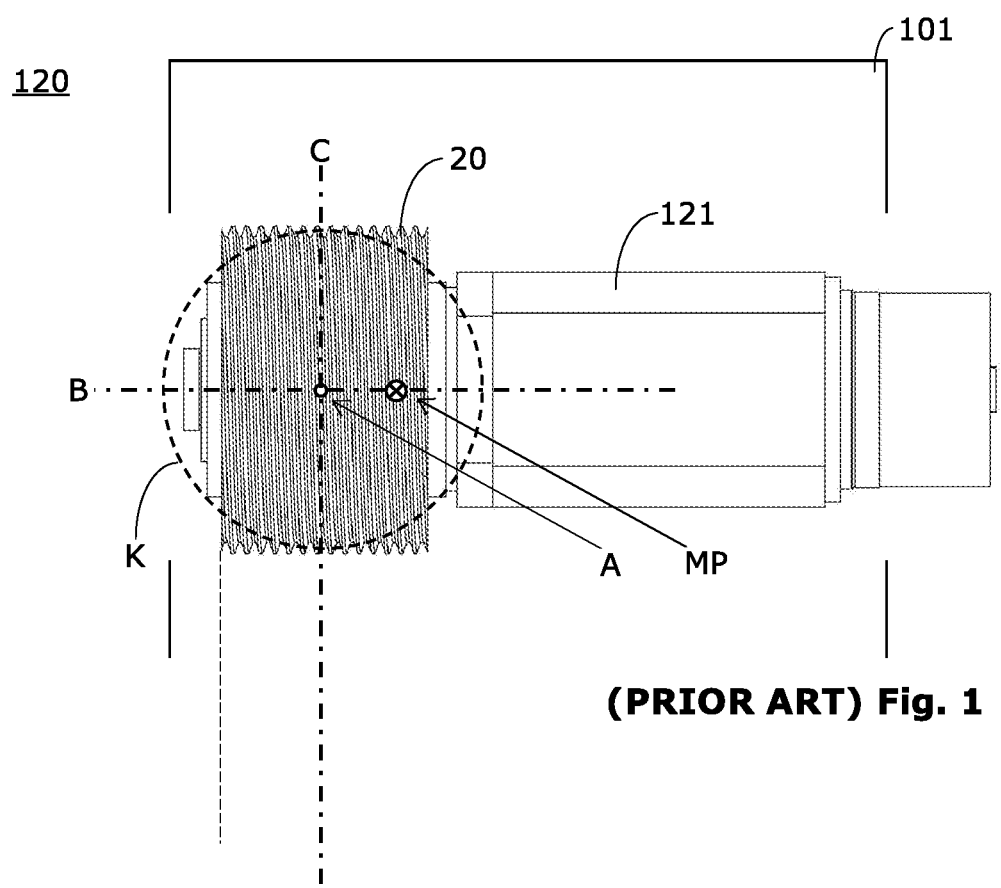
(PRIOR ART) Fig. 1

GRINDING MACHINE WITH PIVOTABLE TOOL SPINDLE

This application claims priority under 35 U.S. C. §§ 119(a)-(d) to German patent application no. 10 2016 006 070.0 filed May 19, 2016 which is hereby expressly incorporated by reference as part of the present disclosure.

FIELD OF INVENTION

The present invention relates to grinding machines fitted with a pivotable tool spindle. At least some grinding machines are concerned whose tool spindle is fitted with a grinding screw for grinding gearwheel workpieces.

BACKGROUND

FIG. 1 shows a schematic view of a portion of a prior art grinding machine. In FIG. 1 a pivotable tool spindle 120 can be seen in a horizontal position. The tool spindle 120 here comprises a spindle housing 121 and a spindle motor, which is hidden in the interior. Attached to the tool spindle 120 is a grinding worm 20, which can be rotatably driven about a tool spindle axis B by means of the spindle motor. In order to enable the pivoting of the tool spindle 120, a pivot axis A is provided, which in this case stands perpendicularly to the drawing plane. Such a grinding machine, which is equipped with a pivotable tool spindle 120, typically comprises a pivot plate, indicated by a dashed circle K in FIG. 1. The pivot plate can be rotated about the pivot axis A in the drawing plane. The pivot axis A is located at the center of the circle K. The pivotable tool spindle 120 is arranged, for example, on a machine stand 101, which can be seen in outlines in the background of FIG. 1.

The workpiece to be ground is not shown in FIG. 1, but the position of the vertically extending workpiece spindle axis C is shown, which intersects with the pivot axis A in the prior art, i.e. in FIG. 1. The workpiece typically sits on a workpiece spindle (not shown), which can be rotationally driven around the workpiece spindle axis C.

In order to intercept unequal torques which act on the tool spindle 120 in this known configuration, the pivot plate, or the pivot axis A, can be mechanically clamped during the grinding of the workpiece. In this case, the pivot axis A can be used only as a setting axis. This means that the pivot axis A cannot be used dynamically, but only statically.

If one wishes to use the pivot axis A as a moving axis during grinding, mechanical clamping is not useful. In this case, a drive motor is required which keeps the pivot axis A in position and can also move it dynamically. The size of the drive motor depends on the torque to be applied. This temporary retaining can be effected, for example, in such a way that the drive motor, which serves to pivot the pivot plate, predetermines a correspondingly large holding current. However, the predetermination of a holding current increases the power consumption of the grinding machine.

SUMMARY

It is the object of some of the embodiments of the invention to provide a technical approach for operating a grinding machine which allows the pivot axis to be operated dynamically. In addition, the grinding machine should be economical to purchase and operate.

The object is achieved according to some of the embodiments of the invention by a grinding machine with a pivotable tool spindle according to claim 1.

Some embodiments of the invention are based on the approach of changing the overall constellation of the grinding machine in such a way that the pivot axis, which is used for pivoting the tool spindle, is arranged laterally offset with respect to the workpiece spindle axis.

In addition, a constellation might be selected in which the pivot axis for pivoting the tool spindle lies in the region of the mass center point of the combination of tool spindle and tool.

These two aspects are combined with one another in at least some embodiments in such a way that the pivot axis is arranged laterally offset with respect to the workpiece spindle axis, and that the pivot axis lies in the region of the center of mass of the combination of the tool spindle and the tool.

At least some embodiments in which the pivot axis directly or indirectly carries a shift axis have an asymmetric shift path of the shift axis.

The grinding machine of some of the embodiments comprises a pivotable tool spindle and is provided with a workpiece spindle adapted to receive a gearwheel workpiece and to rotationally drive the gearwheel workpiece about a workpiece spindle axis. The tool spindle is designed/configured for accommodating a grinding tool and for rotationally driving the grinding tool about a tool spindle axis and is supported by a pivot axis such that the tool spindle together with the grinding tool can be pivoted about the pivot axis. In at least some embodiments, the pivot axis can carry a shift axis directly or indirectly. However, embodiments are also possible which operate without an actual shift axis. In such embodiments, the shift movement parallel to the tool rotation axis is typically generated by the superimposed movement of other linear axes. In this case, the pivot axis is supported directly or indirectly by one or more linear axes.

The grinding machine of some of the embodiments is wherein the pivot axis is offset laterally relative to the workpiece spindle axis and therefore the pivot axis and the workpiece spindle axis do not intersect.

The fact that the pivot axis and the workpiece spindle axis do not intersect can also be expressed as follows. The pivot axis and the workpiece spindle axis cross each other in the three-dimensional space and they only intersect when the pivot axis is projected into the plane of the workpiece-spindle axis planes.

The tool spindle, including the grinding tool in some of the embodiments, has a center of mass which lies directly in the region of the pivot axis. If the pivot apparatus of the pivot axis does not support a shift axis, then the center of mass is a static point that is fixed with respect to the tool spindle, including the grinding tool. If the pivot apparatus of the pivot axis carries a shift axis, then the center of mass is a point which can shift depending on the shift position of the tool spindle and the grinding tool.

If the center of mass is directly in the region of the pivot axis, a balanced constellation of the tool spindle and the tool is obtained. A balanced constellation is designated as an arrangement in which the pivot axis lies exactly in the central center of mass of the pivot apparatus, including the tool spindle and the grinding tool, or the pivot axis lies directly in the region of the center of mass.

It is a significant advantage of some of the embodiments that the drive of the pivot axis can be dimensioned smaller than before, since it is only necessary to compensate for smaller torques. The drive of the pivot axis can be designed smaller, which leads to an improved energy efficiency of the machine.

It is a further advantage of some of the embodiments that, due to the balanced constellation of the tool spindle and tool, no holding forces or smaller holding forces are required for holding the pivot axis. The balanced constellation of some of the embodiments provides an additional degree of freedom which makes it possible to carry out pivoting movements at any time, wherein the corresponding drive can be smaller-dimensioned than in previous solutions. At least some embodiments of the invention thus make possible the transition from a machining approach that has hitherto been static in nature to a dynamic machining approach.

Some of the embodiments can be used for example in gear grinding machines.

Some of the embodiments can be used above all in gear grinding machines which are designed for the grinding machining of straight and helical teeth. In particular, this concerns grinding machines which are designed for continuous rolling or profile grinding.

Some of the embodiments can be used above all in gear grinding machines which are designed for the grinding machining of workpieces which are arranged in the gear grinding machine on a workpiece spindle with a vertical axis of rotation and which comprise a tool spindle with a grinding tool (in at least some embodiments with a grinding worm) which can be pivoted about a pivot axis standing perpendicularly to the workpiece spindle axis.

It is a further advantage of some of the embodiments that the machine width can be provided with a smaller dimension if the tool spindle with a grinding tool is arranged offset to the left for example. This is because the relatively long end of the grinding spindle, or the housing of the grinding spindle, protrudes less far above the carriage of the shift axis.

The shift axis is arranged symmetrically to the workpiece spindle axis in at least some embodiments.

The carriage width of the shift axis can be reduced in at least some embodiments.

The carriage width, or the shift path of the shift axis, can be asymmetric in at least some embodiments.

DRAWINGS

FIG. 1 shows a schematic front view of a tool spindle with grinding worm, as used in prior art grinding machines;

DETAILED DESCRIPTION OF EMBODIMENTS

Figure 2A:
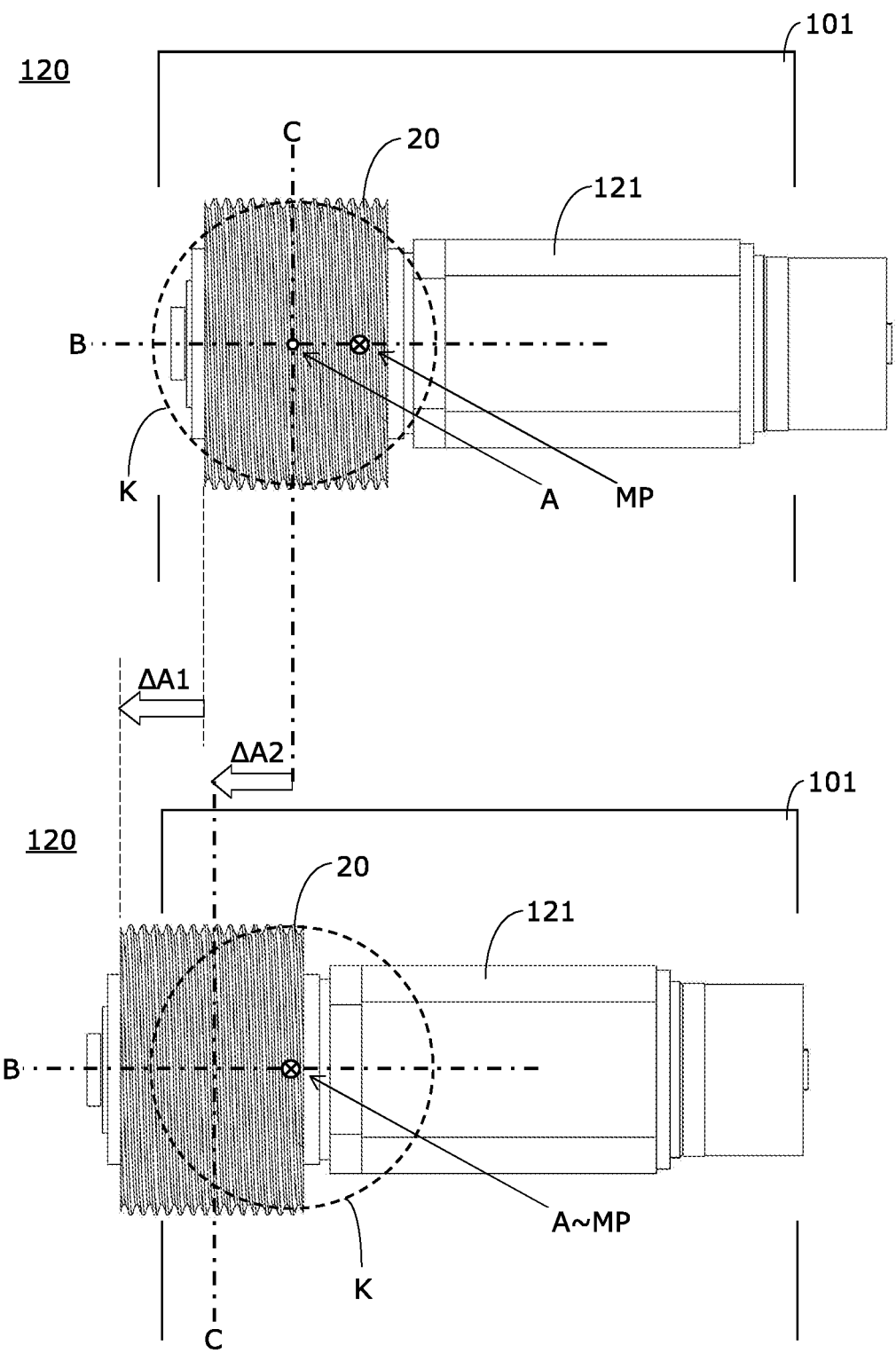
FIG. 2A shows a schematic front view of a tool spindle with grinding worm, which according to a first embodiment is pivotally mounted with its center of mass directly in the region of a pivot axis, and in which the workpiece spindle axis is offset laterally relative to the pivot axis, juxtaposed, for reference, a schematic front view of the tool spindle (with grinding worm) of FIG. 1.

Within the scope of the present description, terms are used which are also used in relevant publications and patents. It should be noted, however, that the use of these terms is intended only for better understanding. The inventive concepts are not to be limited by the specific choice of the terms. At least some embodiments of the invention can be transferred without further ado to other conceptual systems and/or subject areas. In other areas, the terms can be applied mutatis mutandis.

On the basis of the initially described FIG. 1, it can be seen that the center of mass MP does not coincide with the passage point of the pivot axis A in prior art machines. Since the spindle motor and the spindle housing 121 are relatively heavy, the center of mass MP, as indicated in FIG. 1, can lie for example to the right of the passage point of the pivot axis A. In addition, the pivot axis A and the workpiece spindle axis C intersect.

The concept of the center of mass MP as used herein refers to the point in which the weight of those parts of the tool spindle 120, together with the tool 20, which are to the right of the center of mass MP are the same as the weight of those parts of the tool spindle 120, together with tool 20, which are to the left of the center of mass MP. The center of mass MP is thus the mean value weighted by the mass of the positions of all mass points of the tool spindle 120 together with the tool 20.

In other words, the tool spindle 120 together with the tool 20 is in an exactly balanced state when an axis perpendicular to the drawing plane of FIG. 1 is passed through the center of mass MP and when the tool spindle 120 together with the tool 20 remains in this position.

If a pivoting table 122 is used as a pivoting device which carries a shift axis and a tool spindle 120 together with a tool 20, the center of mass MP is the mean value weighted with the mass of the positions of all mass points of the pivoting table 122, the shift axis, the tool spindle 120 and the tool 20.

A first example of an embodiment will now be described with reference to FIG. 2A by means of a first exemplary embodiment. In this first embodiment, the pivot axis A, or a pivot plate (not shown here) of the pivot axis A, carries only a tool spindle 120 and a tool 20.

The two steps which led to the constellation according to at least some embodiments of the invention are explained with reference to FIG. 2A. FIG. 2A shows an exemplary constellation according to at least some embodiments of the invention, in which the pivot axis A has its passage through the tool spindle 120 together with the tool 20 exactly in the center of mass MP. In this ideal case, the following statement applies:

A=MP.

More generally, the passage of the pivot axis A can lie directly in the region of the central center of mass in at least some embodiments. Therefore the more general statement applies:

A~MP.

It can be recognized with respect to FIG. 2A that the position of the tool spindle 120 relative to the position of the pivoting table or the pivot axis A is displaced with the balanced bearing of the tool spindle 120 together with the tool 20. The position of the pivoting table is indicated here by a dashed circle K, as also in FIG. 1.

Furthermore, if possible, the tool 20 should be arranged centrally with respect to the workpiece 10 to be ground, so that all regions of the workpiece 10 can be easily reached and machined with all regions of the tool 20. Therefore, an axis offset ΔA2 is provided as described below.

The offset between the conventional position of the tool spindle 120 in FIG. 1 and the new position of the tool spindle 120 in FIG. 2A is designated by the reference symbol ΔA1 and is indicated by a block arrow. In the constellations shown in FIGS. 1 and 2A, the position of the machine stand 101 and the position of the pivot axis A together with pivot plates (indicated by the circle K) remain the same. In FIG. 2A, only the tool spindle 120 together with the tool 20 has been shifted relative to the position of the pivot axis A by ΔA1 and the position of the workpiece spindle axis C by ΔA2 to the left. The displacement of the workpiece spindle axis C relative to the position of the pivot axis A is described in the following. ΔA1 can be equal to ΔA2 in at least some embodiments. However, ΔA1 and ΔA2 can also have different values in at least some embodiments.

Instead of selecting an overall constellation, in which the pivot axis A and the workpiece spindle axis C continue to intersect (as shown in FIG. 2A), the workpiece spindle axis C is assigned a different position relative to the pivot axis A according to at least some embodiments of the invention.

Figure 2B:
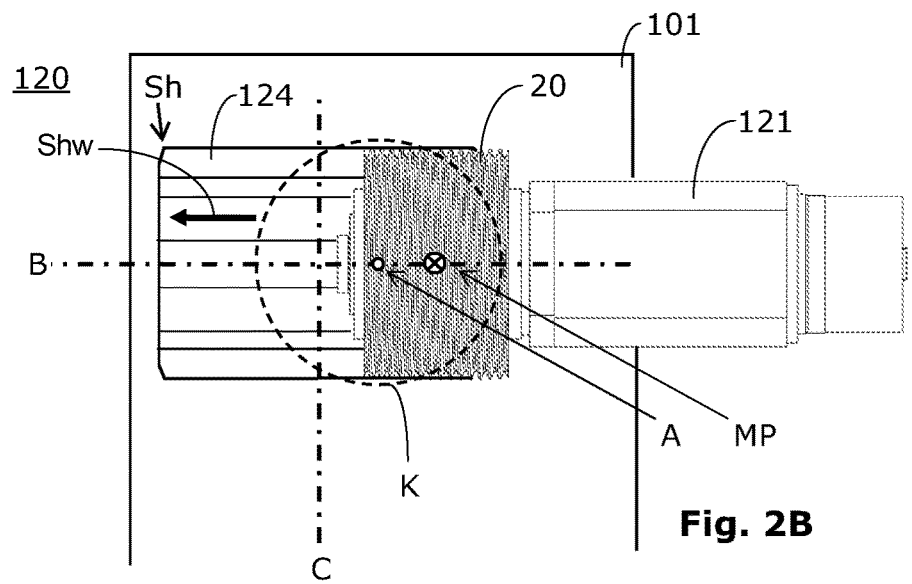
FIG. 2B shows a schematic front view of a tool spindle with grinding worm, which according to a second embodiment comprises a shift axis, wherein, in the situation shown, the tool spindle with grinding worm sits at a right end of the shift axis.
Figure 2C:
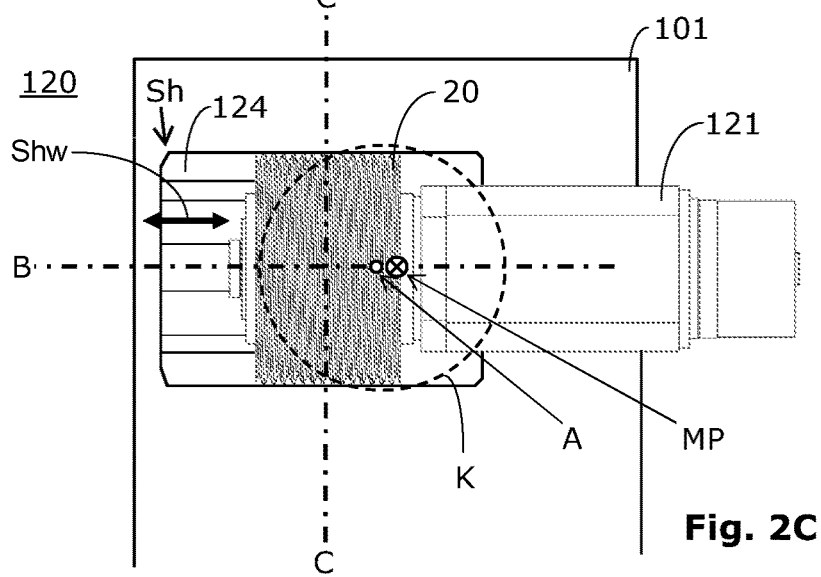
FIG. 2C shows a schematic front view of the second embodiment of FIG. 2B, wherein, in the situation shown, the tool spindle with grinding worm sits approximately at the center of the shift axis.
Figure 2D:
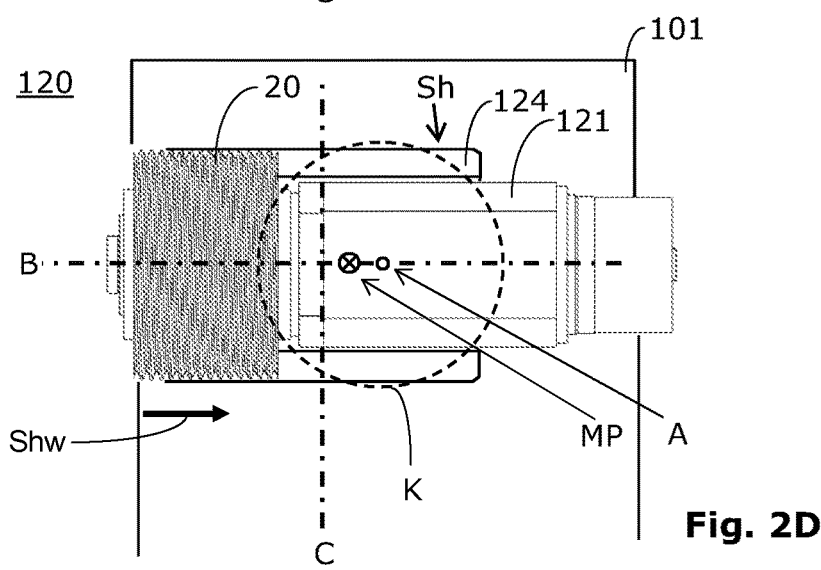
FIG. 2D shows a schematic front view of the second embodiment of FIG. 2B, wherein, in the situation shown, the tool spindle with grinding worm sits at a left end of the shift axis.
Figure 3A:
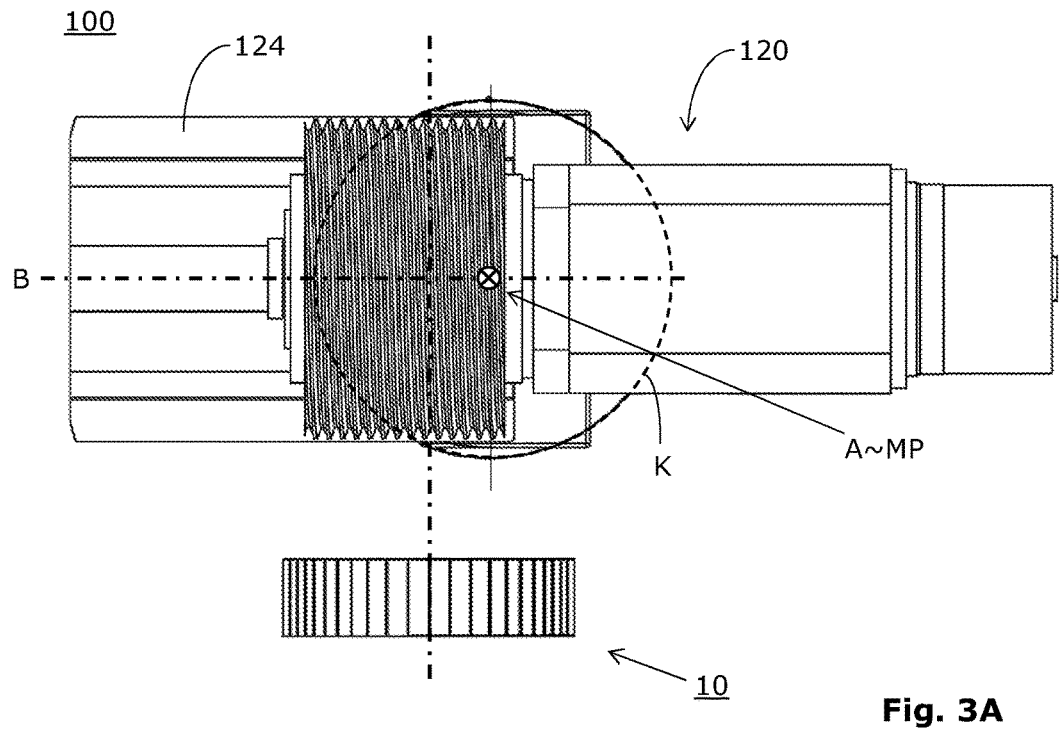
FIG. 3A shows a schematic front view of a tool spindle with grinding worm, which according to a third embodiment of the invention comprises a shift axis, wherein a gearwheel workpiece is shown below the grinding worm.

According to at least some embodiments of the invention, an overall constellation is provided for at least some embodiments in which the pivot axis A has a lateral offset ΔA2 relative to the workpiece spindle axis C, as can be clearly seen in FIG. 2A and in FIG. 3A. FIGS. 2A to 2D and FIG. 3A clearly show that the pivot axis A and the workpiece spindle axis C cross each other but do not intersect. In embodiments with a shift axis Sh which carries a pivot axis A, this statement applies primarily to a basic or zero position. Depending on the shift path Shw of the shift axis Sh, the corresponding machine can temporarily assume a position at which the pivot axis A and the workpiece spindle axis C intersect.

However, the pivot axis A and the workpiece spindle axis C always intersect in a common plane projection. The plane projection mentioned here stands perpendicularly to the drawing plane. The corresponding plane can be the plane, for example, in which the workpiece spindle axis C lies.

In at least some embodiments, the pivot axis A extends perpendicularly to the workpiece spindle axis C in the mentioned plane projection, as can be seen in FIGS. 2A to 2D, 3A and FIG. 4. These two axes A and C can, however, also extend obliquely with respect to each other in a common plane projection in at least some embodiments.

In at least some embodiments, in order to enable a grinding machining of a gearwheel workpiece 10 (a straight spur gear 10 is shown by way of example in FIG. 3A), the grinding machine 100 is designed to carry out several movements in a three-dimensional space in a controlled manner.

Therefore, a shift axis Sh is used in at least some embodiments, which is designed for the transverse displacement of the tool spindle 120 together with the grinding tool 20 in a vertical plane which stands perpendicularly to the pivot axis A. The transverse displacement is performed along a shift path Shw. In the representations of FIGS. 2A-2D, 3A, 3B and 4, said vertical plane extends in parallel to the drawing plane.

Figure 3B:
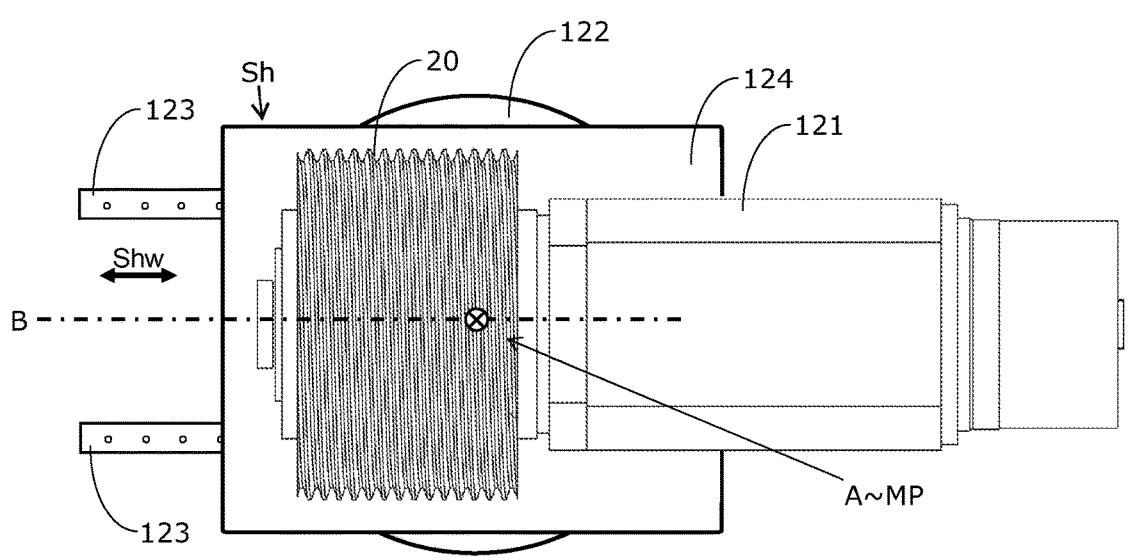
FIG. 3B shows a schematic front view of the tool spindle with grinding worm according to FIG. 3A, wherein exemplary details of the shift axis are shown.

In FIGS. 2B-2D, a linear carriage 124 of the shift axis can be seen in outlines in three different shift positions. A linear carriage 124 can also be seen in FIG. 3A. FIG. 3B shows details of an exemplary shift axis Sh. In the embodiments shown in FIGS. 2B-2D, 3A and 3B, as well as in FIG. 4, the shift axis Sh sits on a pivot plate 122, which is rotatably mounted about the pivot axis A. In at least some embodiments, the pivot plate 122 lies concentrically in relation to the pivot axis A.

In at least some embodiments, the shift axis Sh is designed as a linear carriage 124, which can comprise two linear guides 123 for example, as indicated in FIG. 3B. Details of a shift axis Sh and such linear carriages 124 are well known and thus no further details are given here.

In addition to the transverse displacement along the shift path Shw, which is made possible here by means of the shift axis Sh, further controlled movements in the three-dimensional space are typically required. In principle, this involves relative movements of the grinding tool 20 with respect to the gearwheel workpiece 10. It is irrelevant for at least some embodiments of the invention whether, for example, the grinding tool 20 is moved and the gearwheel workpiece 10 is rotationally driven only about the workpiece spindle axis C, or whether the also gearwheel workpiece 10 can carry out (linear) movements for example.

Figure 4:
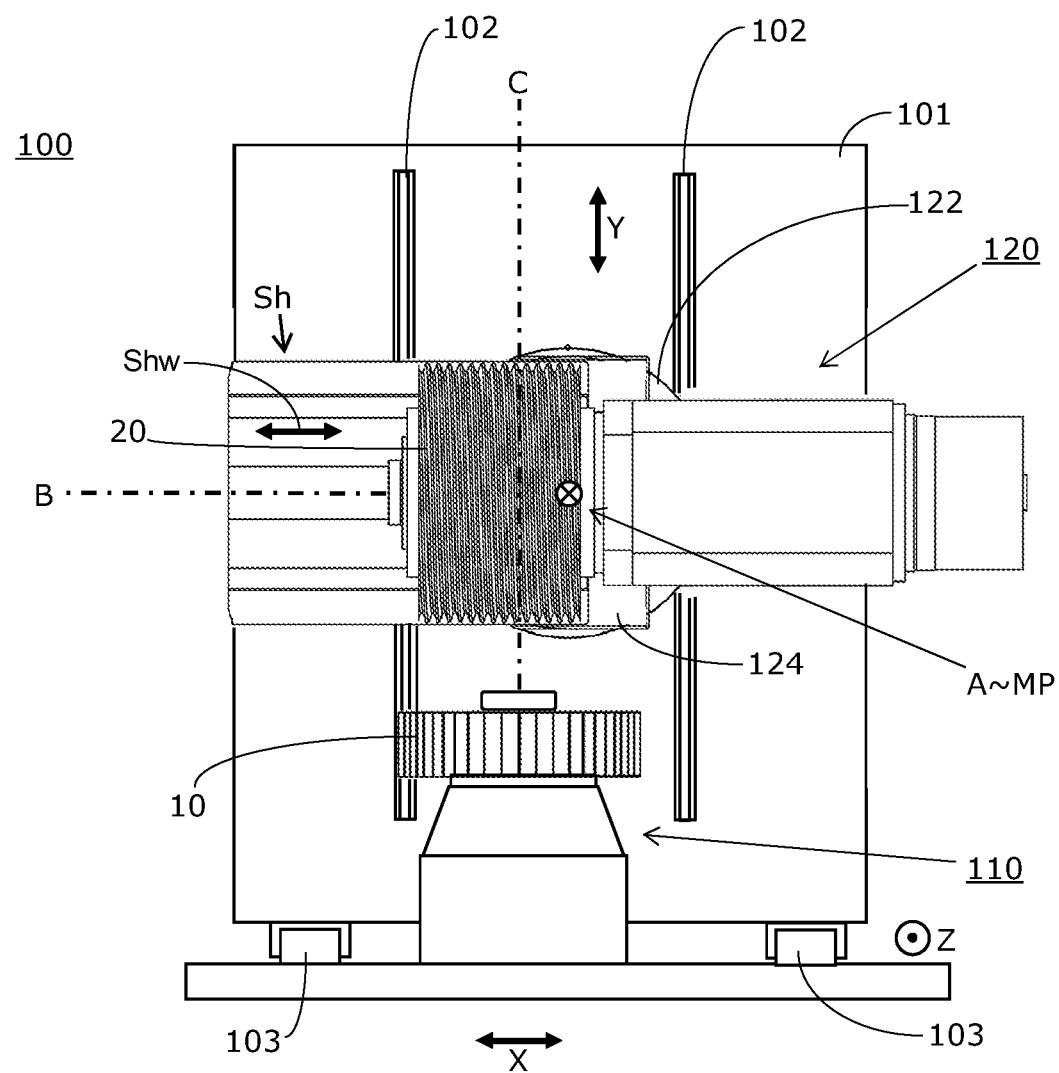
FIG. 4 shows a schematic front view of a grinding machine of an embodiment.

A preferred constellation of a grinding machine 100 of an embodiment is shown in FIG. 4. As already described above, the grinding machine 100 of some embodiments comprises a tool spindle 120, which is arranged in at least some embodiments in relation to the pivot axis A in such a way that the pivot axis A penetrates the tool spindle 120 directly in the region of the center of mass MP. In each case, the pivot axis A has a relative lateral offset against the position of the workpiece spindle axis C. As already mentioned above, in at least some embodiments a pivot plate 122 can be used, which carries a linear carriage 124. The linear carriage 124 is part of the shift axis Sh.

In addition, in at least some embodiments, the grinding machine 100 can have three further axes X, Y, Z which are designed as linear axes.

A first of these further axes, referred to here as a Y-axis, extends in the example shown parallel to the workpiece spindle axis C, as shown in FIG. 4. This Y-axis can be arranged, for example, on a machine stand 101 of the grinding machine 100. In FIG. 4, it can be seen that the Y-axis can comprise two linear guides 102 for example. The Y-axis on the machine stand 101 carries the pivot axis A here and the pivot axis A again carries the shift axis Sh as well as the tool spindle 120 together with the tool 20. Details of such a linear Y-axis are well known and no further details are given here.

The Y-axis is used to perform a stroke (grinding stroke parallel to the C-axis). The Y-axis can be integrated in at least some embodiments into the machine stand 101, which also carries the tool spindle 120, as shown in FIG. 4. However, the Y-axis can also be arranged in at least some embodiments in the region of the workpiece spindle 110 in order to allow displacing the workpiece spindle 110 together with the gearwheel workpiece 10 parallel to the C-axis.

A second one of these further axes, referred to here as the Z-axis, extends, for example, parallel to the pivot axis A. In the representation of FIG. 4, the corresponding Z-axis stands perpendicularly to the drawing plane. This Z-axis can, for example, enable a radial feed movement of the machine stand 101 with respect to the gearwheel workpiece 10. In FIG. 4, it can be seen that the Z-axis can comprise two linear guides 103 for example. Details of such a linear Z-axis are well-known and no further details are given here.

The X-axis of such a grinding machine 100 can extend parallel to the drawing plane. In the illustrated snapshot, the tool spindle axis B lies parallel to the X-axis. If the shift axis Sh is located on the pivot plate 122, as shown in FIG. 4 by way of example, then the X-axis is not absolutely necessary. The linear movement parallel to the X-axis can be realised, for example, by the linear movement of the workpiece spindle 110 or by the linear movement of the machine stand 101 relative to the workpiece spindle 110. Such arrangements are also well known.

The three further axes X, Y, Z form a Cartesian coordinate system in at least some embodiments, as shown in FIG. 4.

Depending on the embodiment, the pivot axis A, or the pivot plate 122, can carry a plurality of components. In the embodiments according to FIGS. 2B to 2D, 3A, 3B and according to FIG. 4, the pivot plate 122 carries, for example, the components of the shift axis Sh and the tool spindle 120 together with the tool 20. In this case, in at least some embodiments, care is taken that the specification of the exactly balanced arrangement or the nearly balanced arrangement of the pivot axis A involves all components which are supported by the pivot plate 122, i.e. the components of the shift axis Sh are also taken into account in determining the center of mass MP. Since the tool spindle 120 together with the tool 20 can be displaced along the shift axis Sh, the center of mass MP also shifts. This will be explained below with reference to FIGS. 2B to 2D.

FIG. 2B shows a schematic front view of a tool spindle 120 with a grinding worm 20, which according to this second embodiment of the invention comprises a shift axis Sh. In the illustrated situation, the tool spindle 120 sits with a grinding worm 20 at a right end of the shift axis Sh. The arrow denoted by Sh in FIG. 2B indicates that when the shift axis Sh is actuated the tool spindle 120 with the grinding worm 20 can only be displaced to the left out of this end position.

FIG. 2C again shows the second embodiment. In the illustrated situation, the tool spindle 120 with the grinding worm 20 sits approximately at the center of the shift axis Sh. The double arrow in FIG. 2C, designated with Sh, indicates that the tool spindle 120 with the grinding worm 20 can be moved out of this central position to the right and left by actuating the shift axis Sh.

FIG. 2D also shows the second embodiment. In the illustrated situation, the tool spindle 120 sits with a grinding worm 20 at a left end of the shift axis Sh. The arrow denoted by Sh in FIG. 2D indicates that the tool spindle 120 with the grinding worm 20 can only be displaced to the right from this end position when the shift axis Sh is actuated.

In the comparison of FIGS. 2B to 2D it can be seen that the center of mass MP is displaced during the displacement of the tool spindle 120 together with the tool 20. In FIG. 2B, the center of mass MP is located to the right of the passage of the pivot axis A. In FIG. 2C, the center of mass MP is located very close to the passage of the pivot axis A and in FIG. 2D the center of mass MP is located to the left of the passage of the pivot axis A. The center of mass MP shifts not necessarily symmetrically to the passage of the pivot axis A.

In practice, a range for the displacement of the center of mass MP is usually obtained which is asymmetrical to the pivot axis A.

If, on the other hand, the axis Sh (in this case, the axis Sh is not a shift axis in the actual sense but a linear axis) carries the pivot plate 122 together with the tool spindle 120 and the tool 20, the components of the axis Sh do not need to be considered in the determination of the center of mass MP. In this case, the corresponding center of mass MP is also referred to as a static center of mass MP. FIG. 2A shows an embodiment with a static center of mass MP.

In embodiments with a static center of mass MP, it can be advantageous to combine the passage of the pivot axis A in the design of the machine 100 with the center of mass MP, as already described. In embodiments with a moving center of mass MP, it can be advantageous to lay the passage of the pivot axis A into the displacement range of the center of mass MP when designing the machine 100, as shown in FIGS. 2B to 2D.

Since the pivot axis A according to at least some embodiments of the invention does not intersect with the workpiece spindle axis C (except possibly in the mentioned temporary special case), a certain asymmetry of the tool spindle 120, or of the tool 20, relative to the workpiece spindle axis C is obtained. This asymmetry can be compensated for in at least some embodiments in such a way that the shift axis Sh is designed for the asymmetrical transverse displacement of the tool spindle 120 together with the grinding tool 20 with respect to the pivot axis A. If the shift axis Sh enables movements of ±150 mm for example in one embodiment of the prior art, the shift axis Sh can allow a movement of +150 mm to the left and a movement of −120 mm to the right in some embodiments. These are merely examples of numbers.

Due to the balanced arrangement, the means for holding can be smaller in size because smaller torques are to be compensated.

Figure 5A:
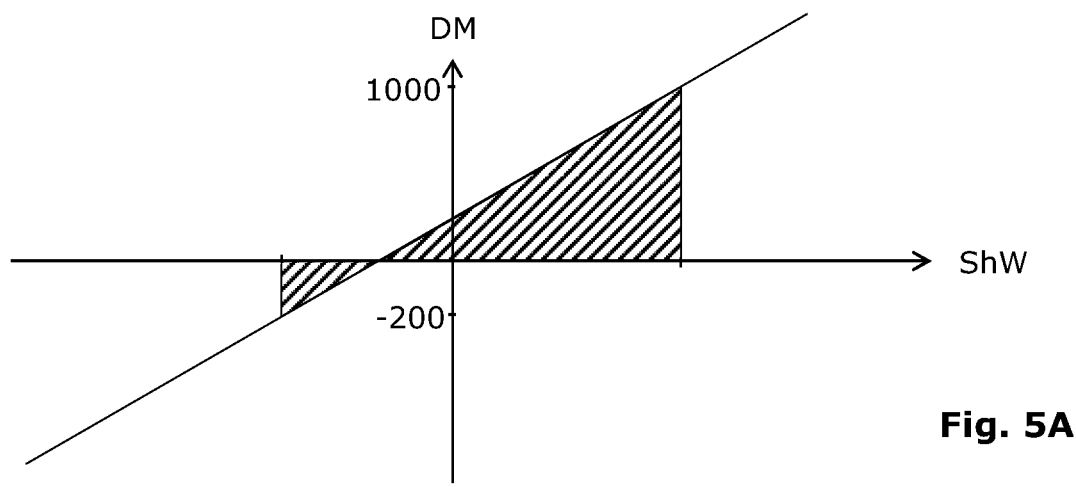
FIG. 5A shows a schematic diagram in which the torque of the pivot axis of a conventional machine constellation is plotted over the shift path of the shift axis.
Figure 5B:
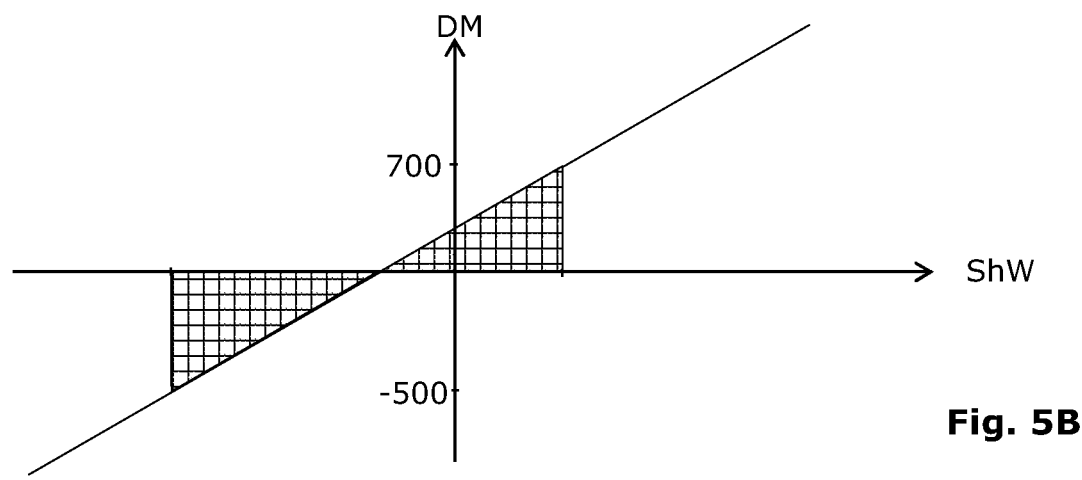
FIG. 5B shows a schematic diagram in which the torque of the pivot axis of a machine constellation according to at least some embodiments of the invention is plotted over the shift path of the shift axis.

In order to illustrate the effect of at least some embodiments of the invention graphically, the numerical examples of a conventional machine constellation were compared with the numerical examples of a machine constellation according to embodiments of the invention in FIGS. 5A and 5B. FIG. 5A shows a schematic diagram in which the torque DM of the pivot axis A of a conventional machine constellation (e.g. as shown in FIG. 1), is plotted via the shift path Shw of the shift axis Sh. Due to the unbalanced constellation, in at least some embodiments, the drive motor of the pivot axis A is able to apply torques DM in the range from 1000 Nm to −200 Nm, i.e. the drive motor is dimensioned so that it can apply a maximum of 1000 Nm.

In FIG. 5B a corresponding schematic diagram of a machine constellation according to at least some embodiments of the invention (e.g. as shown in FIG. 4) is plotted over the shift path Shw of the shift axis Sh. Due to the significantly better balanced constellation, in at least some embodiments, the drive motor of the pivot axis A is only be able to apply torques DM in the range of 700 Nm to −500 Nm, i.e. the drive motor is dimensioned such that it can apply a maximum of 700 Nm.

In an ideally balanced constellation, the values of the positive and the negative torque DM are the same. In order to remain at similar numerical values as in FIGS. 5A and 5B, in at least some embodiments, the torque of an ideally balanced constellation could be at ±600 Nm for example, i.e. the drive motor is dimensioned in such a way that it can apply a maximum of 600 Nm.

The quality of the balancing can thus be defined for example via the torque values. The smaller the amount-related difference ΔDM of the torque values is, the better the constellation is balanced. At ΔDM=0, the constellation is ideally balanced.

According to at least some embodiments of the invention, the center of mass MP is then directly in the region of the pivot axis A if at least one of the following conditions is fulfilled (the figures in brackets refer to the numerical example in FIG. 5B):

B1. If the amount-related smaller value of the negative and of the positive torque (500 Nm is less than 700 Nm) deviates by less than 30% from the larger value (here 700 Nm). In the embodiment of FIG. 5B, the 500 Nm are approximately 71.43% of the 700 Nm. The value which is smaller in respect of amount therefore deviates by less than 30% from the larger value and the condition B1 is considered fulfilled. In the embodiment of FIG. 5A, these values deviate by 80% from each other and the condition B1 is far from being fulfilled.

B2. If the difference (700 Nm−500 Nm=200 Nm) of the absolute value of the positive torque (700 Nm) and the absolute value of the negative torque (|−500 Nm|=500 Nm) deviate by less than 20% of the sum (700 Nm+500 Nm=1200 Nm) of the absolute value of the negative torque (|−500 Nm|=500 Nm) and of the absolute value of the positive torque (700 Nm). In the embodiment of FIG. 5B, this definition yields a value of approx. 16.67%. Since 16.67% is less than 20%, in the case of FIG. 5B the condition B2 is regarded as fulfilled. In the embodiment of FIG. 5A, this definition yields a value of approximately 66.67% and the condition B2 is by no means fulfilled.

B3. If in a diagram in which the torque DM of the pivot axis A is plotted over the shift path Shw of the shift axis Sh, the course of the torque DM is symmetrical with respect to the axis which maps the shift path Shw, the condition B3 is fulfilled.

B4. If in a diagram in which the torque DM of the pivot axis A is plotted over the shift path Shw of the shift axis Sh, the course of the shift path Shw is symmetrical with respect to the axis which maps the torque DM, the condition B4 is fulfilled.

In at least some embodiments, the conditions B1 and/or B2 are applied to constellations in which the pivot axis A does not carry a shift axis Sh (see FIG. 2A for example).

In at least some embodiments, the conditions B2 and/or B3 and/or B4 are applied to constellations in which the pivot axis A carries a shift axis Sh (see FIGS. 2B-2D, 3A, 3B, 4 for example).

With respect to FIG. 5B, it can be seen by way of example that the shift axis Sh can be designed for the asymmetrical transverse displacement of the tool spindle 120 together with the grinding tool 20 with respect to the pivot axis A. The shift path Shw goes significantly further into the negative range than in the positive range of the diagram (i.e. the shift axis Sh allows larger movements to the left than to the right).

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. A grinding machine comprising:
    a pivotable tool spindle defining a tool spindle axis, and
    a workpiece spindle defining a workpiece spindle axis and adapted to receive a gearwheel workpiece and to rotationally drive the gearwheel workpiece about the workpiece spindle axis,
    wherein
    the grinding machine further comprises a pivoting table defining a pivot axis,
    the tool spindle is configured to receive a grinding tool and to rotationally drive the grinding tool about the tool spindle axis,
    the tool spindle with a received grinding tool is pivotable about the pivot axis, and
    the pivot axis is offset laterally relative to the workpiece spindle axis and does not intersect the workpiece spindle axis, and
    the grinding machine further comprises a shift axis member (i) configured to transversely displace the tool spindle and a grinding tool received thereby in a vertical plane perpendicular to the pivot axis and (ii) supported by the pivoting table, wherein the shift axis member, the tool spindle and a grinding tool received thereby collectively define a movable center of mass located at or near the pivot axis.

2. A grinding machine according to claim 1, wherein the shift axis member, the tool spindle and a grinding tool received thereby collectively define a movable center of mass which is displaceable within a symmetrical or asymmetrical region defined about the pivot axis.

3. A grinding machine according to claim 1, wherein the shift axis member, the tool spindle and a grinding tool received thereby collectively define a displaceable center of mass, wherein the center of mass is displaceable based on a shift position of the shift axis member.

4. A grinding machine according to claim 1, wherein the shift axis member is configured to provide asymmetrical transverse displacement of the tool spindle and a grinding tool received thereby relative to the pivot axis.

5. A grinding machine according to claim 1, wherein the pivot axis lacks a means to clamp the tool spindle, and the tool spindle with a grinding tool received thereby defines a center of mass at a position whereby said tool spindle and grinding tool received thereby is balanced at or near the pivot axis.

6. A grinding machine according to claim 1, wherein the grinding machine defines three additional axes which are configured as linear axes, and wherein
    a first of said additional axes extends parallel to the workpiece spindle axis,
    a second of said additional axes extends parallel to said pivot axis, and
    the three additional axes define a Cartesian coordinate system.

7. A grinding machine according to claim 1, wherein the grinding tool includes a grinding worm.

8. A grinding machine according to claim 1, wherein the grinding machine defines a gear grinding machine configured to grind machine straight and oblique toothing on a gearwheel workpiece.

9. A grinding machine according to claim 1, wherein the grinding machine defines a gear grinding machine configured to grind machine a gearwheel workpiece mounted on the workpiece spindle, wherein the workpiece spindle axis is a vertical workpiece spindle axis, and wherein the pivot axis is perpendicular to the vertical workpiece spindle axis.

* * * * *